No. 886,701. PATENTED MAY 5, 1908.
P. HESSELIUS.
CHANGE SPEED GEAR.
APPLICATION FILED MAR. 5, 1907.
2 SHEETS—SHEET 1.
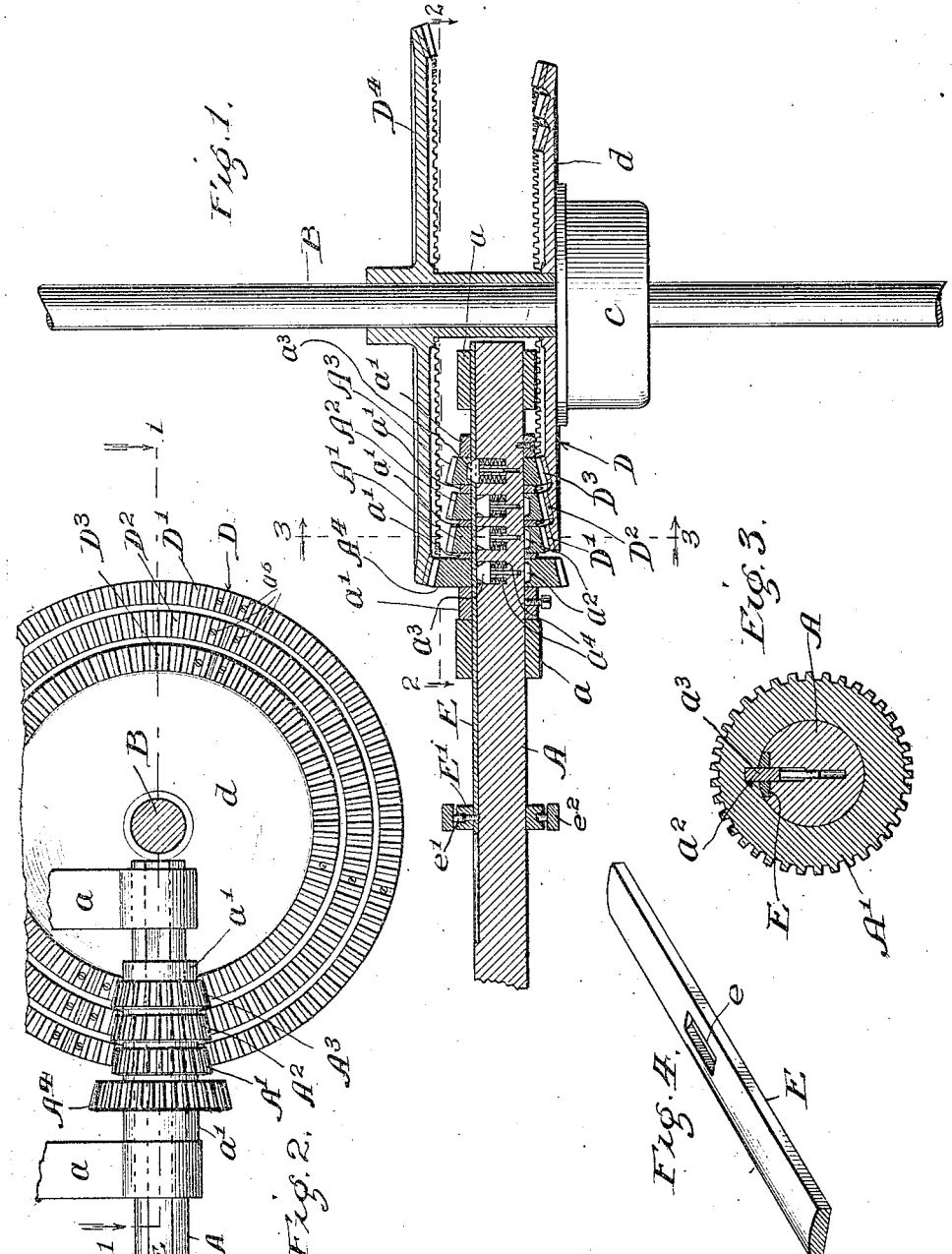
Witnesses:
Inventor:
Peter Hesselius
by Poole & Brown
Attys.

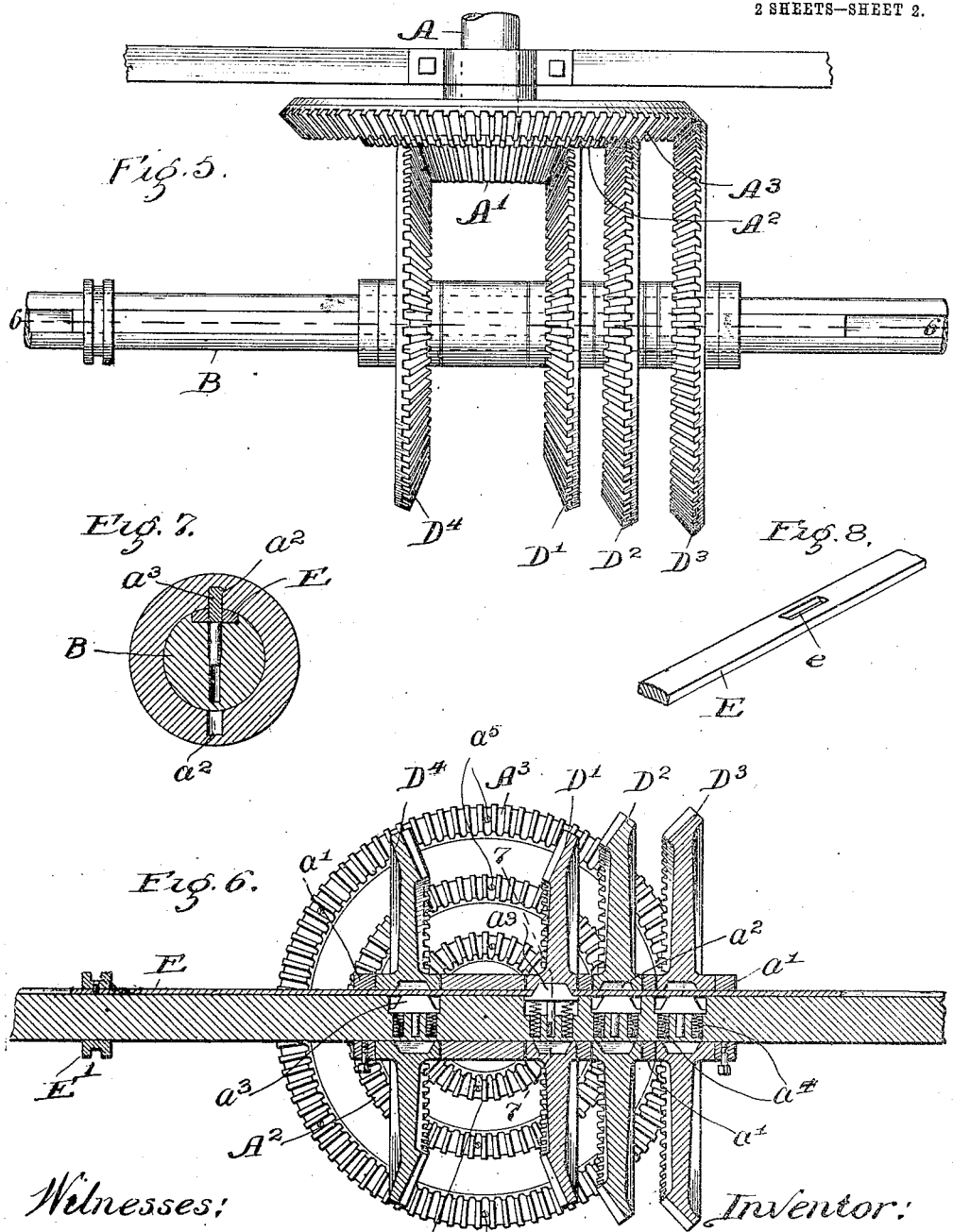

UNITED STATES PATENT OFFICE.

PETER HESSELIUS, OF CHICAGO, ILLINOIS.

CHANGE-SPEED GEAR.

No. 886,701.   Specification of Letters Patent.   Patented May 5, 1908.

Application filed March 5, 1907. Serial No. 360,651.

*To all whom it may concern:*

Be it known that I, PETER HESSELIUS, a citizen of the United States, and a resident of Chicago, in the county of Cook and State of Illinois, have invented certain new and useful Improvements in Change-Speed Gear; and I do hereby declare that the following is a full, clear, and exact description thereof, reference being had to the accompanying drawings, and to the letters of reference marked thereon, which form a part of this specification.

This invention relates to variable speed power transmitting gears and more especially to a gear of that class in which any one of a set of gear wheels rotatively mounted on a shaft and meshing with another set of gears fixed to a second shaft can be non-rotatively secured to its shaft for the purpose of transmitting power from one of said shafts to the other.

My invention may be better understood by reference to the accompanying drawings, in which,—

Figure 1 is a horizontal section of my improved gear, said section being taken on line 1—1 of Fig. 2. Fig. 2 is a vertical section on line 2—2 of Fig. 1. Fig. 3 is an enlarged detail section on line 3—3 of Fig. 1. Fig. 4 is a perspective view of the slotted bar included in my device. Fig. 5 is a plan view showing my device with its elements arranged in a different manner. Fig. 6 is a vertical section on line 6—6 of Fig. 5. Fig. 7 is an enlarged detail section on the line 7—7 of Fig. 6. Fig. 8 is a perspective view of the slotted bar included in my device.

In Figs. 1 to 4, inclusive, I have shown a form of my improved gear with its elements more especially arranged to constitute a transmission gear for use in automobiles to transmit power from a longitudinal driving shaft to the rear wheels of the vehicle, and in Fig. 1 is indicated in outline a differential gear of ordinary form which can be used in connection with my device. As shown in said Figs. 1 to 4, inclusive, A indicates a driving shaft mounted in bearings or journals $a\ a$ and B indicates a driven shaft. Said driven shaft, as herein shown, may be either the jack-shaft of an automobile, from the ends of which power is transmitted to the rear wheels by means of sprockets and chains in a familiar manner, or said shaft may be the rotative shaft of a live rear axle of ordinary form. For either of said purposes the shaft B consists of two parts having their adjacent ends connected with a differential gear C of ordinary form. Rigidly fixed to the case of said differential gear is a bevel gear wheel D comprising a web portion $d$ and three bevel gears $D^1\ D^2\ D^3$ of different diameters secured to said web by means of screws $a^5$. On a cylindrical extension of said differential gear case, in the form of a sleeve surrounding the shaft B, is fixed a bevel gear $D^4$. The bevel gear wheel D and the bevel gear $D^4$ are arranged with their faces toward each other. On the driven shaft A are rotatively mounted four bevel pinions $A^1\ A^2\ A^3$ $A^4$ of approximately equal diameter, the first three of which mesh, respectively, with the bevel gears $D^1\ D^2$ and $D^3$, and the fourth with the bevel gear $D^4$. Said pinions are secured against longitudinal movement on the shaft A by means of thrust collars $a^1$. Means are provided for non-rotatively securing any one of the pinions $A^1\ A^2$ or $A^3$ to its shaft in order to transmit rotary motion from said shaft A to said shaft B in varying ratios of angular velocity, and for non-rotatively securing the pinion $A^4$ to its shaft in order to transmit, through the bevel gear $D^4$, rotary motion to said shaft B in a reverse direction. Said means comprises parts as follows: Each of the pinions $A^1$, $A^2$, $A^3$, $A^4$ is provided in the inner face of the bore of its hub with one or more radial notches $a^2\ a^2$ adapted to be engaged by radially arranged, inwardly and outwardly movable keys $a^3\ a^3$ mounted on the shaft A. Said keys, when retracted, rest within radial recesses in the shaft A. Each of said keys comprises a flat sided head fitting within a parallel sided groove in the shaft A and a cylindrical stem adapted to fit and slide in a round hole drilled radially into the shaft. Each of said keys is pressed outward by two coiled springs $a^4\ a^4$, acting under compression. Over the outer ends of said keys is a longitudinally arranged bar E, fitting within a longitudinal recess which extends along the side of the shaft A, which bar serves to press the keys radially inward against the action of their springs. Said bar E is provided near one end with a longitudinal slot $e$ of the proper length to allow one of the keys to project through the same when the bar is placed in position with the slot over or in register with one of the keys; and said bar can be slid longitudinally in its recess along the shaft A in order to bring the slot opposite either of said keys and thereby permit any one of the keys to move outward. Moreover, the end surfaces of the slot e, and likewise the sides of the keys engaged by said end surfaces, are beveled or inclined so that longitudial movement of the bar E will force inward any one of the keys which may be projecting through the slot e. To one end of said bar E is fixed a shifting collar $E^1$ having a circumferential groove engaged by studs $e^1$ $e^1$ on a fork $e^2$ of familiar construction.

From the foregoing it will be seen that by sliding the bar E into proper position to allow one of the keys to project through the slot e, any one of the three pinions $A^1$ $A^2$ or $A^3$ can be non-rotatively secured to its shaft, thereby transmitting motion through one of the respective gears $D^1$ $D^2$ or $D^3$ to the shaft B. The different diameters of the gears $D^1$ $D^2$ and $D^3$ provide three ratios of angular velocities between the two shafts. By locking the pinion $A^4$ upon its shaft motion can be transmitted through the gear $D^4$ to the shaft B in a reverse direction.

In Figs. 5 to 8, inclusive, I have shown my device with three driving pinions $A^1$ $A^2$ and $A^3$ rigidly fastened together by means of screws $a^5$ and arranged in the form of a stepped cone, which is non-rotatively fixed to the driving shaft A, and the four driven gears $D^1$ $D^2$ $D^3$ and $D^4$ rotatively mounted on the driven shaft B and adapted to be secured from rotation thereon by means of the keys $a^3$, as above described. The two gears $D^1$ and $D^4$ meshing with the pinion $A^1$ on diametrically opposite sides thereof are driven by said pinion $A^1$ in opposite directions and provide means for reversing the direction of rotation of the driven shaft B. The difference in the ratios of the gears $A^1$ and $D^1$, $A^2$ and $D^2$ and $A^3$ and $D^3$ provide three different ratios of angular velocities between the shafts A and B. Moreover, since my device is adapted for other uses besides use in an automobile, I have shown my said device in Figs. 5 to 8, inclusive, with the shaft B made in one piece and the driven gears $D^1$ $D^2$ $D^3$ and $D^4$ mounted directly thereon without the interposition of a differential gear or any equivalent device.

I claim as my invention:—

1. In a variable speed power transmitting device, the combination with a driving shaft, and a driven shaft, of means for imparting rotation from said driving shaft to said driven shaft, said means comprising a plurality of gear wheels mounted for separate rotation on one of said shafts and means for non-rotatively securing said gear wheels to their shaft, said latter means comprising a radial notch in the bore of each gear wheel, radially movable keys mounted in the shaft, and a longitudinally movable bar mounted in the shaft and provided with a slot adapted to receive said keys.

2. In a variable speed power transmitting device, the combination with a driving shaft and a driven shaft, of means for imparting rotation from said driving shaft to said driven shaft, said means comprising a plurality of gear wheels mounted for separate rotation on one of said shafts, and means for non-rotatively securing said gear wheels to their shaft, said latter means comprising a radial notch in the bore of each gear wheel, radially movable keys mounted on the shaft, springs yieldingly pressing said keys outward, and a longitudinally movable bar mounted on said shaft and provided with a slot adapted to receive said keys.

3. In a variable speed power transmitting device, the combination with a driving shaft and a driven shaft, of means for imparting rotation from said driving shaft to said driven shaft, said means comprising a plurality of gear wheels mounted for separate rotation on one of said shafts, and means for non-rotatively securing said gear wheels to said shaft embracing a plurality of radially movable spring actuated keys, one for each gear wheel, a longitudinally arranged movable bar mounted to slide endwise on said shaft and provided with a slot adapted to be brought opposite either of said keys by the endwise movement of said bar.

4. In a variable speed power transmitting device, the combination with a driving shaft and a driven shaft, of a plurality of means for imparting rotation from said driving shaft to said driven shaft, said means comprising gear wheels mounted for separate rotation on one of said shafts, and means for non-rotatively securing the said gear wheels to the shaft embracing radially movable keys mounted on the shaft, springs applied to press said keys outwardly, and a longitudinally sliding bar mounted on the shaft and provided with a slot adapted for the passage of said keys, the ends of the slot and the end faces of the keys being provided with beveled contact surfaces.

5. In a variable speed power transmitting device, the combination with a shaft provided with a longitudinal groove, and a plurality of gear wheels having radial notches in the bores of their hubs, of spring actuated keys movable radially in the shaft, and a longitudinally movable bar located in the said longitudinal groove of the shaft and provided with a slot for the passage of the said keys.

6. In a variable speed power transmitting device, the combination with a driving shaft and a driven shaft, of a bevel gear wheel mounted on one of said shafts, a bevel gear wheel intermeshing therewith and rotatively mounted on the other shaft, and means for non-rotatively securing said latter bevel gear wheel to and releasing it from its shaft, said means comprising a radial notch in the bore of said latter gear wheel, a radially movable key mounted on the shaft, a spring yieldingly pressing said key outward, and a longitudinally movable bar mounted on said shaft and provided with a slot adapted to receive said key.

7. In a variable speed power transmitting device, the combination with a driving shaft and a driven shaft, of a plurality of bevel gear wheels rotatively mounted on one of said shafts, radial notches in the bores of the hubs of said gear wheels, spring actuated keys movable radially in the shaft, a longitudinally sliding bar mounted on the shaft and provided with a slot adapted for the passage of said keys, and a bevel gear wheel mounted on the other of said shafts, said bevel gear wheel being provided with a plurality of bevel gears adapted severally to intermesh with said first mentioned gear wheels.

8. In a variable speed power transmitting device, the combination with a driving and a driven shaft, arranged at an angle to each other, of a wheel or disk mounted on one of said shafts and provided on its lateral face with a plurality of beveled gears, a plurality of beveled gear wheels meshing therewith and loosely mounted on the other shaft, said gear wheels being provided with radial notches in the bores of their hubs, another beveled gear wheel loosely mounted on the shaft carrying the loosely mounted gears, provided with a radial notch in the bore of its hub and rotatively connected with the other shaft in a manner to impart rotation from one of said shafts to the other in a direction opposite to the direction of rotation imparted by said first mentioned intermeshing gears and gear wheels, keys movable radially in the shaft carrying the loosely mounted gear wheels, and a longitudinally sliding bar mounted on the shaft and provided with a slot adapted for the passage of said keys.

In testimony, that I claim the foregoing as my invention I affix my signature in the presence of two witnesses, this 27th day of February A. D. 1907.

PETER HESSELIUS.

Witnesses:
W. L. HALL,
T. H. ALFREDS.